United States Patent
Kroos

(10) Patent No.: US 11,147,412 B2
(45) Date of Patent: Oct. 19, 2021

(54) MILK FROTHER SYSTEM AND OPERATING METHOD

(71) Applicant: Tchibo (Schweiz) AG, Wallisellen (CH)

(72) Inventor: Friedrich Kroos, Greifensee (CH)

(73) Assignee: TCHIBO (SCHWEIZ) AG, Wallisellen (CH)

( * ) Notice: Subject to any disclaimer, the term of this patent is extended or adjusted under 35 U.S.C. 154(b) by 282 days.

(21) Appl. No.: 16/080,098

(22) PCT Filed: Feb. 17, 2017

(86) PCT No.: PCT/EP2017/053715
§ 371 (c)(1),
(2) Date: Aug. 27, 2018

(87) PCT Pub. No.: WO2017/148717
PCT Pub. Date: Sep. 8, 2017

(65) Prior Publication Data
US 2019/0053660 A1    Feb. 21, 2019

(30) Foreign Application Priority Data

Feb. 29, 2016 (EP) .................................. 16157854

(51) Int. Cl.
*A47J 31/44* (2006.01)
*A47J 31/46* (2006.01)

(52) U.S. Cl.
CPC ....... *A47J 31/4485* (2013.01); *A47J 31/4489* (2013.01); *A47J 31/46* (2013.01)

(58) Field of Classification Search
CPC .... A47J 31/4485; A47J 31/4489; A47J 31/46; A47J 31/469; A47J 31/4496

(Continued)

(56) References Cited

U.S. PATENT DOCUMENTS

| | | | | |
|---|---|---|---|---|
| 6,019,032 A | * | 2/2000 | Arksey | A47J 31/24 261/DIG. 16 |
| 7,654,191 B2 | * | 2/2010 | Greenwald | A47J 31/56 99/275 |

(Continued)

FOREIGN PATENT DOCUMENTS

| | | |
|---|---|---|
| CH | 706370 | 10/2013 |
| EP | 2 047 779 | 4/2009 |

(Continued)

OTHER PUBLICATIONS

English translation of International Preliminary Report on Patentability dated Sep. 4, 2018 (Sep. 3, 2018), Application No. PCT/EP2017/053715, 5 pages.

*Primary Examiner* — Ibrahime A Abraham
*Assistant Examiner* — Frederick F Calvetti
(74) *Attorney, Agent, or Firm* — Rankin, Hill & Clark LLP

(57) ABSTRACT

A milk frother system includes a gear pump which, at an inlet side is connected at least to a milk feed conduit that, for its part, is connected during operation to a milk vessel that can be filled with milk, for example by way of it projecting into the vessel. The gear pump sucks milk out of the milk vessel via the milk feed conduit. The system also includes a feed conduit for water and/or steam to the gear pump, for example in order to rinse this after use or also, by way of the feed of steam, to heat the delivered milk. The milk frother system is configured, under predefined conditions and before delivery of milk, to deliver water and/or steam to the gear pump via the feed conduit, in order to wet the gear pump.

10 Claims, 4 Drawing Sheets

(58) Field of Classification Search
USPC .................................................. 99/293, 323.1
See application file for complete search history.

(56) References Cited

U.S. PATENT DOCUMENTS

| | | | | |
|---|---|---|---|---|
| 8,372,462 | B2* | 2/2013 | Douma | A47J 43/121 |
| | | | | 426/474 |
| 8,561,841 | B2* | 10/2013 | Erman | A47J 31/402 |
| | | | | 222/63 |
| 8,646,380 | B2* | 2/2014 | Mueller | A47J 31/4485 |
| | | | | 99/293 |
| 8,678,244 | B2* | 3/2014 | Yang | A47K 5/1217 |
| | | | | 222/333 |
| 8,833,238 | B2* | 9/2014 | Hansen | A47J 31/0621 |
| | | | | 99/283 |
| 8,846,121 | B2* | 9/2014 | Hansen | A47J 31/0605 |
| | | | | 426/232 |
| 9,265,383 | B2* | 2/2016 | Yang | B05B 12/122 |
| 10,329,135 | B2* | 6/2019 | Savioz | B01F 5/0496 |
| 10,568,454 | B2* | 2/2020 | Balkau | A47J 31/4485 |
| 10,582,799 | B2* | 3/2020 | Balkau | A47J 31/4496 |
| 10,588,450 | B2* | 3/2020 | Balkau | A47J 31/4485 |
| 10,638,872 | B2* | 5/2020 | Balkau | A47J 31/44 |
| 2007/0272317 | A1* | 11/2007 | Klopfenstein | B67D 1/0046 |
| | | | | 137/889 |
| 2008/0277421 | A1* | 11/2008 | Zlatic | A47K 5/16 |
| | | | | 222/136 |
| 2011/0143006 | A1* | 6/2011 | Douma | A47J 43/121 |
| | | | | 426/474 |
| 2012/0285992 | A1* | 11/2012 | Ciavarella | A47K 5/16 |
| | | | | 222/138 |
| 2014/0193558 | A1* | 7/2014 | Mosconi | A47J 31/4485 |
| | | | | 426/474 |
| 2016/0051083 | A1* | 2/2016 | Turi | A47J 31/60 |
| | | | | 426/474 |
| 2016/0256016 | A1* | 9/2016 | Yang | B05B 11/3047 |
| 2017/0127875 | A1* | 5/2017 | Savioz | A47J 31/4485 |
| 2017/0273502 | A1* | 9/2017 | Doglioni Majer | A47J 31/5255 |
| 2017/0303732 | A1* | 10/2017 | Balkau | A47J 31/4489 |
| 2017/0303733 | A1* | 10/2017 | Balkau | A47J 31/469 |
| 2017/0303734 | A1* | 10/2017 | Balkau | A47J 31/4489 |
| 2017/0303735 | A1* | 10/2017 | Balkau | A47J 31/4485 |
| 2017/0340161 | A1* | 11/2017 | Andreis | A47J 31/4489 |
| 2018/0237283 | A1* | 8/2018 | Savioz | A47J 31/4485 |
| 2018/0325306 | A1* | 11/2018 | Mathure | A47J 31/4403 |
| 2018/0360276 | A1* | 12/2018 | Yang | A47K 5/1208 |
| 2019/0191917 | A1* | 6/2019 | Dubief | A47J 31/401 |
| 2020/0270114 | A1* | 8/2020 | Merati | B67D 1/0888 |

FOREIGN PATENT DOCUMENTS

| | | |
|---|---|---|
| EP | 2 298 142 | 3/2011 |
| EP | 2 326 224 | 10/2011 |
| EP | 2 698 087 | 2/2014 |
| JP | 2004-314604 | 11/2004 |
| JP | 2005-76582 | 3/2005 |
| WO | 2008/083941 | 7/2008 |
| WO | 2010/020918 | 2/2010 |
| WO | 2016/017700 | 2/2016 |
| WO | 2016/046237 | 3/2016 |
| WO | 2016/046238 | 3/2016 |

* cited by examiner

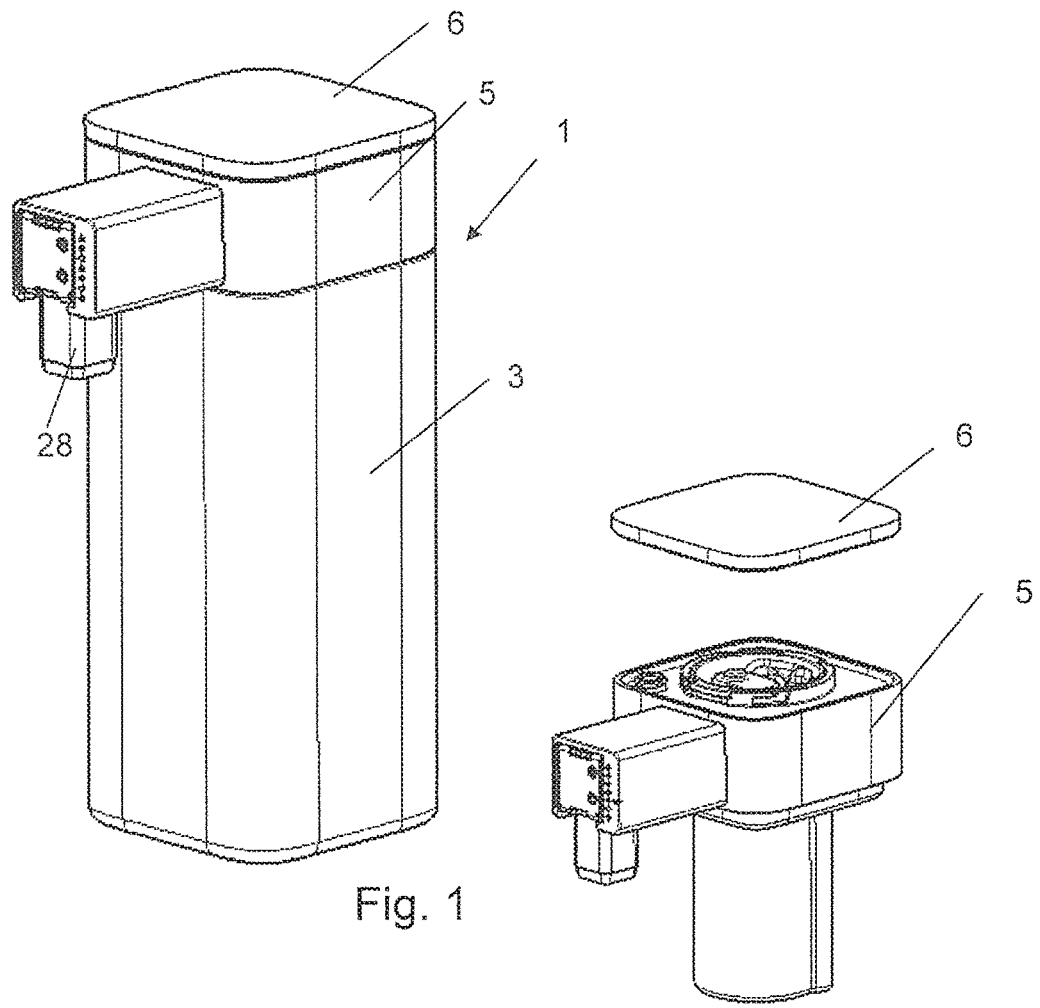
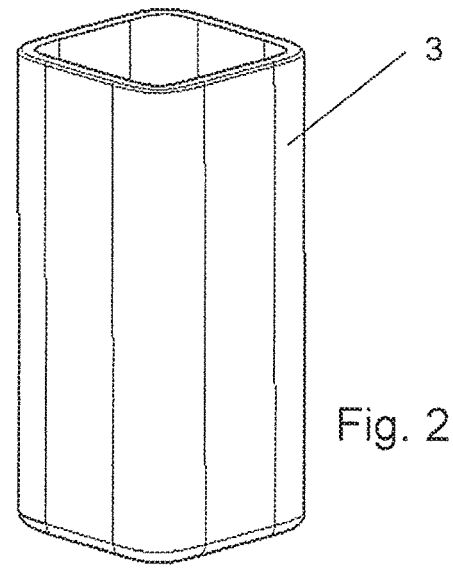

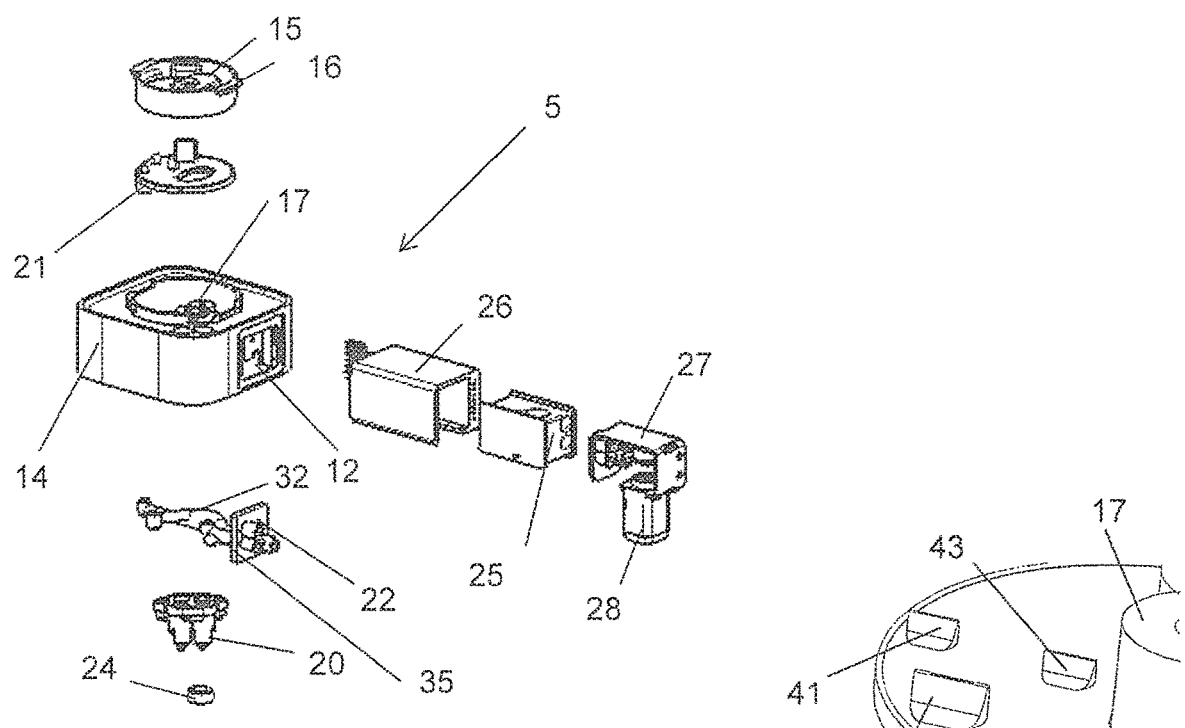
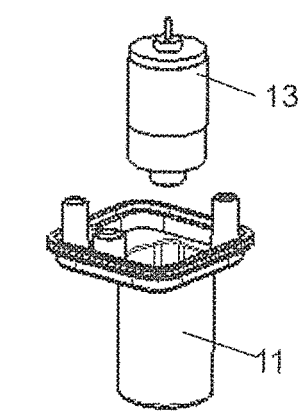
Fig. 3
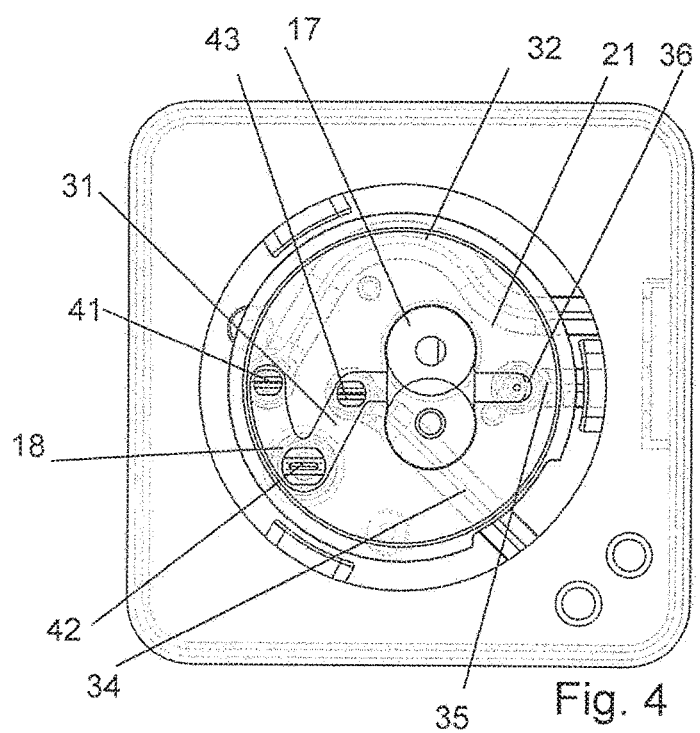

MILK FROTHER SYSTEM AND OPERATING METHOD

BACKGROUND OF THE INVENTION

Field of the Invention

The invention generally relates to the field of appliances for preparing drinks and, more particularly, to a system for producing milk froth and for preparing milk drinks or milk drink constituents.

Description of Related Art

Milk frother appliances as integrated modules of coffee machines or as separate appliances that are dockable onto coffee machines are known. EP 2 047 779 discloses a coffee machine with a dockable milk module, wherein hot steam from the coffee machine is used to froth milk which is sucked out of a vessel of the milk module according to the Venturi principle. EP 2 326 224 for example shows a milk frother which includes a gear pump as a central froth-producing element. At the inlet side of the gear pump, this sucks air and milk which is simultaneously frothed when being delivered through the gearwheels and is dispensed at the outlet side as frothed milk. Optionally, steam can be additionally fed in the gear pump, so that the dispensed frothed milk is warm.

A milk frother appliance, which is dockable onto a base unit of a drinks preparation machine and which has a gear pump which sucks milk from a milk vessel and, inasmuch as air is also fed at the inlet side, also froths this milk, is also known, for example, from the international patent application PCT/EP2015/071792 or the international patent application PCT/EP2015/071794.

With regard to systems such as the aforementioned ones, concerning which the gear pump sucks the milk that is to be delivered, the gear pump must produce a vacuum at the inlet side, the vacuum corresponding at least to the maximal height of the fluid column of the milk that is to be sucked-in practice, for example, corresponding to the height of the gear pump above the base of the milk vessel, from which this sucking is effected. With such a height of 20 cm, this. e.g., nonetheless results in a vacuum of 20 mbar in comparison to the air pressure. Furthermore, a narrowing (nozzle) is often present at the outlet side, so that additional resistance is present at the outlet side of the pump-which can once again slightly increase the pressure difference to be generated by the pump. As a whole, this places very high demands on the sealedness of the gear pump which, since it is the case of foodstuffs, is not allowed to be lubricated. Even given a very small leakage, for example along the outer periphery of the gearwheels or along their face surfaces (between the pump casing and the gearwheels) or between the gearwheels, air immediately flows from the high-pressure side (outlet side) onto the low-pressure side (inlet side) and immediately compensates pressure differences. This problem is amplified by way of a possible wearing of the gearwheels, which mesh in one another, wherein such wearing can result over long-term use and can produce such small leakages even during use.

Furthermore, depending on the field of application, demands are placed upon the gear pump with regard to its cleaning and for this the gear pump is also taken apart on a daily basis. Complex sealing systems etc. for the gear pump are therefore disqualified nor only for reasons of cost but also due to the requirement of a simple cleaning by the user. A frequent disassembly and reassembly are not conducive to the precision of the individual components.

SUMMARY OF THE INVENTION

It is therefore the object of the present invention to create a milk frother system with a gear pump, which overcomes the disadvantages of the state of the art and which in particular permits the demands that are placed upon the tolerances of the gear pump to be reduced-and by way of this permits the manufacturing costs to be reduced-and/or permits the sensitivity with regard to wear and tear given long-term use to be reduced, even if a milk vessel, from which the milk is to be sucked, lies lower than the gear pump.

A milk frother system according to the present invention includes a gear pump, which, at the inlet side, is connected at least to a milk feed conduit, which, in the operating condition, is connected to a milk vessel that is fillable with milk, for example by way of this conduit projecting into this vessel, in order to suck the milk. The system moreover includes a feed conduit for water and/or steam for the gear pump, in order for example to rinse this after use, or also (in particular by way of feeding steam) in order to heat the delivered milk. According to the invention, the milk frother system is configured to wet the gear pump by way of water or steam, which is delivered via the feed conduit, before a delivery of milk, under predefined conditions.

This approach is based on the recognition that a liquid in the gear pump produces a certain sealing effect, for example along the face surface of the gearwheels and along the outer periphery of the gearwheels. This sealing effect occurs due to the milk as soon as the gear pump has delivered milk. On account of the approach according to the invention, it functions-by way of water-even of the gear pump were to be dry, for example given a first starting operation after a cleaning has been effected or after a longer period of not having been used.

On account of the approach according to the invention, the gear pump in the dry condition does not therefore need to suck liquid via a liquid column, but is wetted with water and/or steam by way of the feed means, without the build-up its own vacuum becoming necessary. This means that the delivery of the water and/or steam into the gear pump for the purpose of wetting is not effected due to the action of the gear pump-it can optionally be effected whilst the gear pump is still at a standstill-but by way of other means of the system, for example by way of a water pump and/or by way of the steam pressure, possible also by way of a suitable downward gradient.

It has been found that due to the approach according to the invention, it is possible to build up a vacuum that is significantly greater compared to the state of the art on account of the adhesion characteristics of the water and the sealing effect resulting therefrom. For this reason, significantly reduced demands are therefore placed upon the component tolerances, in order to then suck the milk out of the milk container. Such an effect is yet even more important if, as is envisaged in preferred embodiments, an air feed is also present at the inlet side of the gear pump, for example if an air valve is additionally opened, in order to also draw in air.

The fact that the system is configured to wet the gear pump under defined conditions not only means that the there would exist the possibility/suitability of carrying out the respective steps, but that specific measures are applied in the system, in order to carry out these steps given designated operation. In particular, a control unit of the system is programmed, under the predefined conditions, to wet the gear pump or the gearwheels of the gear pump before the milk is delivered, if the user has directly or indirectly (for example via the selection of a corresponding program) requested and therefore activated the delivery of milk. The activation by the user, under the predefined conditions therefore firstly leads to a wetting of the gear pump and only then to a delivery (possibly in combination with a frothing and/or heating) of the milk.

The milk vessel, for example, is part for the milk frother system and is arranged further to the bottom than the gear pump, for example vertically below the gear pump. In an embodiment, the milk vessel is designed in a beaker-like manner and the milk feed conduit projects from above into the milk vessel; it is then open at the end, wherein this end-side opening is arranged essentially at the base of the milk vessel. Systems with a milk vessel which at the bottom includes a closable discharge opening which for its part is connected via an ascending conduit as a milk feed conduit to the inlet side of the gear pump are also not to be ruled out.

The predefined conditions, under which the gear pump is wetted before a delivery of milk can be:

A. Wetting only if the system has been switched on after the last operation of the gear pump, has been woken from a standby mode or sleep mode, or if the milk frother appliance with the gear pump has been removed from the base unit of the drinks preparation machine.

B. Wetting only if more than a predefined time (for example a predefined time between 10 min and 120 min) has elapsed since the last operation of the gear pump.

C. Wetting only if, by way of a measurement, it has been ascertained that an adequate humidity is not present in the gear pump. Such a measurement for example can be a hygroscopic measurement in the liquid path directly upstream or directly downstream of the gear pump, or also an indirect measurement, for example via the electricity consumption of the gear pump on briefly switching on (characteristic of the mechanical resistance), the oscillation behavior (acoustic characteristics), etc.

D. Wetting only under conditions which can be specified by the user, for example by way of active activation by the user when he ascertains that the pump does not function.

Combinations are also possible, for example carrying out a measurement according to C. only if condition A. is fulfilled or condition B. is fulfilled, an and-operation or or-operation of conditions A. and B., etc. Furthermore, more complicated empirical models that take into account the prior history that can be stored in memory means of a control are possible, etc. In all these examples, the wetting takes place or does not take place depending on a predefined condition. Furthermore, there is also the possibility:

E. Wetting before each operation of the gear pump (i.e. predefined condition is always fulfilled).

The gearwheels of the gear pump are coated, for example, with a heat-resistant, low-friction and low-adhesion material, for example a fluorine-containing polymer, in particular a perfluoroalkoxy polymer (PFA) or from polyoxymethylene (POM). They can also consist completely of such a material or of another plastic and be manufactured in an injection molding method or by way of other manufacturing methods. This is a particularly advantageous option on account of the approach according to the invention, since such coatings or materials ensure a low-noise operation.

Basically, any material that is suitable for foodstuffs, absorbs little water and has the necessary heat-resistance, low-friction and low-adhesion is conceivable. However, particularly pronounced shrinkages and deviations from predefined dimensions occur due to their relative low firmness on using PFA or similar materials, and this can be compensated by the procedure according to the invention.

The water quantity, which is used for wetting, can be relatively low and even small volumes can ensure a sufficient wetting. In practice, it has been found that volumes between 1 ml and 10 ml, in particular of 6 ml or less are sufficient, depending on the pump geometry and arrangement of the feeding conduits (the specified volumes are liquid volumes, i.e. the volume of the condensed steam in the case of steam). The addition of such a small water quantity has no significant influence on the quantity of the drink in the case of drinks quantities which are common for milk drinks or milk-containing drinks.

As already mentioned, air feed means, for example an air feed conduit with an air feed valve, can be present at the inlet side of the gear pump. Such an air feed at the inlet side of the gear pump can be designed such that it can be switched on and off, and the gear pump merely serves for delivering the milk in the switched-off condition of this air feed or if such is not present at all.

Apart from delivering/pumping milk and frothing milk, the gear pump can also be used for those systems which suck and/or admix a syrup or a similar aromatised additional ingredient. An additional conduit, which is connected to the gear pump at the inlet side and which has a metering device arranged upstream, can optionally be present for this purpose. Such a conduit can lead directly into the gear pump or onto another location at the low-pressure side of the gear pump.

In embodiments, the milk frother system is formed by a drinks preparation machine that, apart from a milk frother appliance, also includes a base unit that is designed as a coffee machine, in particular with a brewing module for receiving a portion package that is filled with coffee powder (capsule coffee machine). The milk frother appliance is dockable onto the base unit and can be supplied with the water and/or steam from this via a suitable interface. The electricity supply and/or activation of the gear pump can also be effected from the base unit.

In embodiments, the air feed of the mentioned type can be effected at the inlet side of the gear pump via an air delivery location of the base unit, wherein air can then be delivered in a regulated manner to the milk frother appliance, for example possibly to its gear pump, from a machine-internal, in particular electronically controlled valve unit. In such embodiments, the milk frother appliance can additionally include an air connection for the air which comes from the base unit and is to be delivered to the milk frothing unit.

The milk frother system, in particular the milk frother appliance can furthermore include a mixing nozzle on a path of the milk that is delivered by the gear pump, to which mixing nozzle this milk, the steam as well as air can be fed. In particular, such a mixing nozzle can be designed such that inflowing steam-which gets into the mixing nozzle from the steam connection-achieves a suction effect in a manner known per se. The sucking of further air and the intermixing with milk, which is fed to the mixing nozzle, can be effected by way of such an effect, by which means-supplementarily or alternatively to the frothing by the gear pump-frothed milk can be produced, the frothed milk being warm on account of the heat that is given off by the steam.

If, with a system with a mixing nozzle, cold frothed or unfrothed milk is to be prepared, one can then envisage no steam being led into this. In this case, the mixing nozzle only serves for leading through the frothed milk Supplementarily or alternatively to a mixing nozzle of the mentioned type, a feed of steam can also be effected directly into the gear pump or at another location of the milk path, for example directly at the inlet side of the gear pump or at the outlet side of this.

The feed conduit for water and/or steam, which, according to the invention, is used for the wetting, can be formed by the steam feed-which, if present runs out into a mixing nozzle, or at another location along the milk path, for example the gear pump itself-and/or it can be formed by a feed conduit, which is also used for cleaning water or cleaning steam for cleaning the gear pump. Such a feed conduit can run into the milk conduit at the inlet side of the gear pump and serve for through-rinsing and, under certain circumstances, also for sterilising the gear pump including the feed conduits and outgoing conduits. A valve, for example a duckbill valve, can be present between this conduit and the inlet side of the gear pump, the valve closing automatically if a lower pressure is present in the region upstream of the gear pump than in the conduit, as would regularly be the case during the operation of the gear pump without the feed of cleaning water or cleaning steam.

The base unit—for example coffee machine-includes, for example, a water container, a water pump and water heating means (continuous heater, boiler). Furthermore, a brewing chamber is present for preparing a hot drink from heated water by way of extraction from an extraction material. The base unit can also include an electronics unit (control unit) that either includes the activation, which is discussed above, and possibly a regulator of the valve unit or-if this unit is part of the milk frother appliance-is in communication with it. Inputs of the user are preferably effected at an input location of this electronics unit, and recognition of a coffee capsule with the extraction material is likewise possibly effected by this. The control of the flow of steam is likewise effected by this electronics module.

The subject-matter of the invention is likewise a method for operating a milk frother system with a gear pump, with regard to which, under defined conditions, the gear pump is wetted before the delivery of milk.

BRIEF DESCRIPTION OF THE DRAWINGS

Embodiment examples of the invention are hereinafter described by way of figures. The same or analogous elements are indicated in the figures by the same reference numerals. There are shown in:

FIG. 1 a view of the appliance for preparing frothed milk (milk frother appliance);

FIG. 2 an exploded representation of the milk frother appliance;

FIG. 3 an exploded representation of the milk frothing unit of the milk frother appliance;

FIG. 4 a view of the milk frothing unit, which is sectioned along a horizontal plane;

FIG. 5 a partial view of the seal of the milk frothing unit with elements of the gear pump, FIG. 6 a view of the upper base housing part of the milk frothing unit, which is sectioned along a horizontal plane;

DETAILED DESCRIPTION OF THE INVENTION

Figure 6:
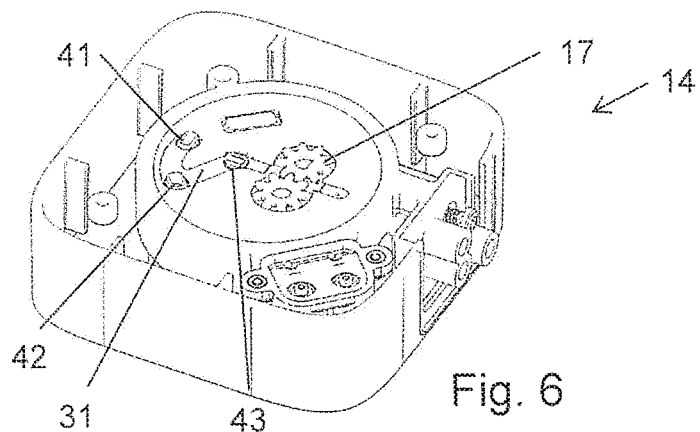

The appliance 1 for preparing frothed milk (milk frother appliance) is represented as a whole in FIG. 1. FIG. 2 shows an exploded representation of its parts. The appliance 1 includes a milk container 3, a milk frothing unit 5 and a cover 6.

The elements of the milk frothing unit 5 are represented in an exploded representation in FIG. 3. A lower base housing part 11 carries an electric motor 13 belonging to the gear pump, as well as an upper base housing part 14. A lateral window 12 is formed in the base housing.

The upper base housing part 14 forms a roughly circularly cylindrical trough, in which gears 17 of a gear pump are arranged. The gearwheels 17 of the gear pump are driven via a shaft 19, which is connected to the electric motor 13. A seal 21 seals the trough to the bottom.

Additionally to the gears, the shaft and the electric motor, the gear pump can also have its own housing, or such can be integrated into the base housing or other parts, for example into a milk frothing unit cover 16. In the represented embodiment example, the milk frothing unit cover 16 is shaped out such that a pump chamber encompassing the gearwheels 17 is formed between the seal 21 and the milk frothing unit cover 16 on account of an arching 15 (also clearly visible in FIG. 12). The dimensioning of the pump chamber is matched in an exactly fitting manner to the outer dimensions of the gearwheels, which, for their part, fit into one another in an exactly fitting manner.

A milk suction tube 18 (not represented in FIG. 3) extends downwards from the plane of the gear pump and projects into the milk container 3 and almost up to the base of this in the assembled condition of the appliance 1.

An activatable valve unit 20 for the air, which gets into the inlet side of the gear pump into the milk frother, is fastened to the base housing 11, 14. Likewise visible in FIG. 3 are a spacer 23 and a motor seal element 24.

A connection shaped part 22 is further present beneath the gear pump. This part seals the window 12 and simultaneously forms a feed-through for connection between conduits of the milk frother, which are fastened to the base housing, and a docking element. The docking element includes a docking element body, which is protected by a docking element housing 26. The docking element body is formed by a base body 25 and a supplementary part 27. Amongst other things, the supplementary part 27 includes a downwardly projecting milk froth outlet 28; and the mentioned mixing nozzle 79 (see FIG. 10) is also arranged in the main body 25 or possibly in the supplementary part.

FIG. 4 shows a view from above, of the milk frothing unit 5, which is sectioned along a plane that lies above the sealing plane defined by the seal 21. The lighter lines in the plan view represent elements running further below, which per se are not visible.

The gear pump is attached above the sealing plane. An upper-side liquid conduit 31 leads to the gear pump. This is connected, on the one hand, to the milk suction tube 18 and, on the other hand, to a hot water and/or steam feed conduit 32, via duckbill valves 42, 42, which are formed by the seal 21 and are also clearly visible in FIG. 5. An air feed conduit 34 is connected to the upper-side liquid conduit, which is to say to the gear pump at the inlet side, likewise via a duckbill valve 43, which is formed by the seal.

Arranged behind the gear pump is a feed-through 36 for the delivered milk which, depending on the selected operating condition, is already frothed, through which feed-through this milk again goes downwards through the sealing plane, where it goes through an outgoing conduit 35 into the docking element and there into the mixing nozzle.

Figure 7:
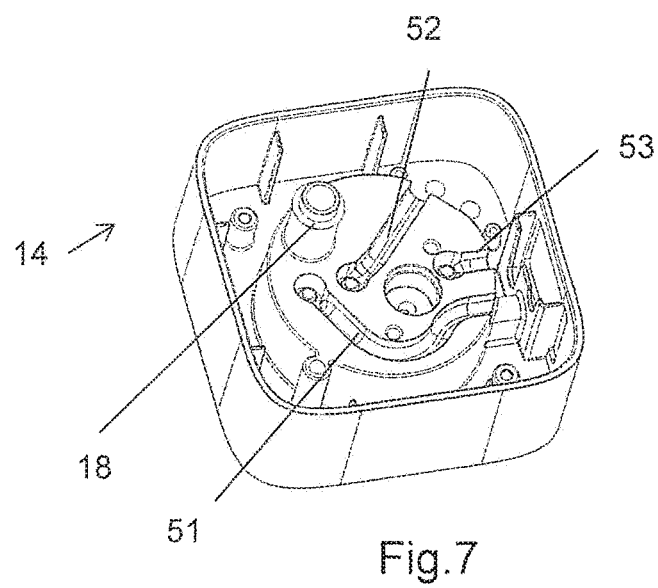
FIG. 7 a view of the upper base housing part from below.
Figure 8:
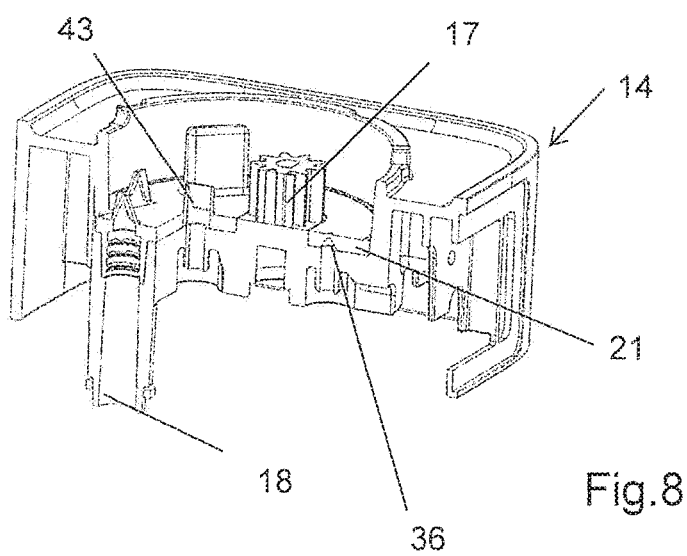
FIG. 8 a view of the upper base housing part, which is sectioned along a vertical plane.

FIGS. 6 to 8 show further views of the upper base housing part 14, which is represented sectioned along a horizontal plane in FIG. 6 and along a vertical plane in FIG. 8 and in a view from below in FIG. 7.

The lower-side conduits are formed by flexible tubes of the connection shaped part 22, which are laid into the corresponding channels of the upper base housing part 14. These, i.e. the channel 51 for the hot water and/or steam feed conduit 32, the channel 52 for the air feed conduit 34 and the channel 53 for the outgoing conduit 35, are particularly clearly visible in the view from below according to FIG. 7.

The seal 21 (FIG. 8) is clamped between the upper base housing part 14 and the milk frothing unit cover (not shown in FIG. 8). The pump chamber of the gear pump including the gearwheels 17 is formed between the milk frothing unit cover and the upper base housing part due to the arching 15 in the milk frothing unit cover (FIG. 3).

Figure 9:
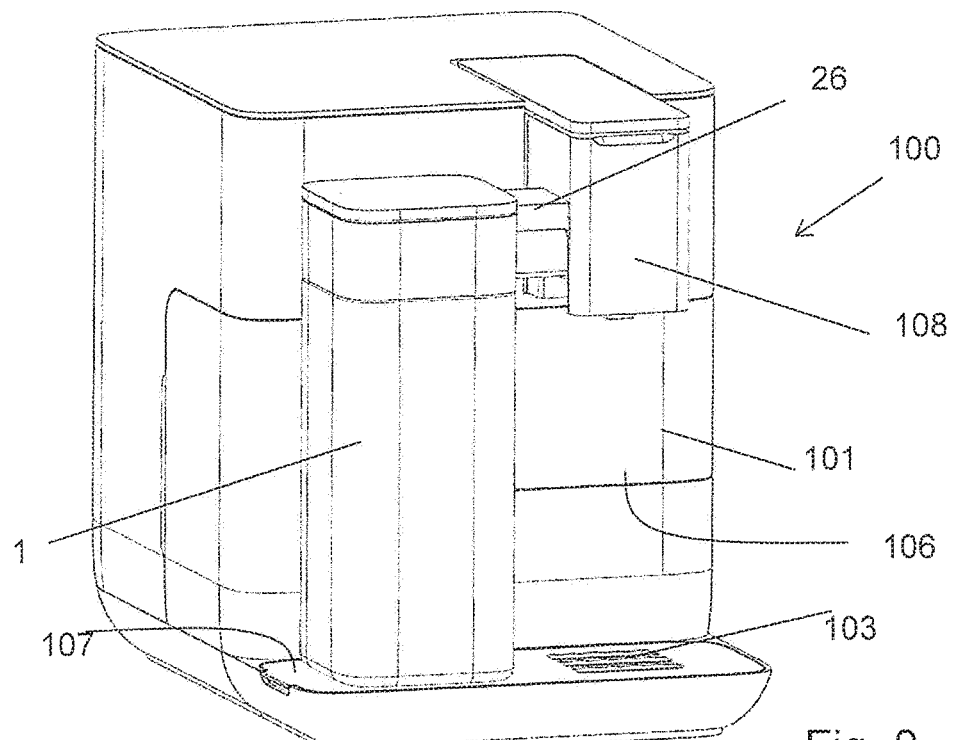
FIG. 9 a view of a drinks preparation machine.

FIG. 9 shows a view of the complete drinks preparation machine 100 with the milk frother appliance 1 and a base unit, which is designed as a coffee machine 101, and onto which the milk frother appliance 1 is coupled.

The coffee machine, as is known per se for coffee machines, includes a water container, a water pump and a water heater. A brewing chamber for preparing coffee from heated water by way of extraction from coffee power is moreover present, the coffee powder being provided, for example, in portion capsules, which were previously inserted into the coffee machine before the preparation. As an alternative to a portion capsule system, the coffee machine can also be designed as a so called bean-to-cup coffee machine, which also includes a coffee mill and grinds the coffer powder in a portioned manner and feeds it to the brewing chamber. As yet a further alternative, particularly if the coffee machine is designed as a piston machine, i.e. the brewing chamber is formed between a fixed part and a removable piston, one can yet also envisage the coffee powder being brought into the brewing chamber by the user in the already ground, but loose (non-compacted) condition.

The coffee machine can further include a capture container for spent coffee powder portions (in capsules or in a loose manner, depending on the design of the coffee machine).

A placement platform 103 for placing a drinks vessel is formed on the coffee machine. A coffee outlet 105, through which brewed coffee runs out and gets into the vessel lying therebelow is located above the placement platform 103. This outlet is located below an outlet hood 108, which forms part of the coffee machine housing and at least partly covers the outlet to the front and to the sides. A connection location 110 for the connection of the docking element onto the coffee machine is located in the proximity of the coffee outlet 105 and here below the outlet hood. This connection location includes a steam delivery location for coupling onto the steam connection of the docking element, and a hot water and/or steam delivery location for coupling (via a conduit in the docking element) onto the hot water and/or steam feed conduit 32. The steam delivery location and the hot water and/or steam delivery location, when required, are supplied with steam and hot water respectively from the water heater, wherein a multi-port valve in the inside of the coffee machine can feed heated liquid or steam selectively to the brewing module, to the steam delivery location or to the hot water and/or steam delivery location.

The docking of the milk frother appliance 1 is effected from the side onto the outlet hood 108, and specifically such that the milk frother appliance as a whole is arranged in front of the coffee machine and laterally of the outlet hood 108.

The connection location further preferably includes electrical contacts. These electrical contacts form an interface and, given a coupled-on docking element, create an electrical connection to corresponding electrical connection element contacts, which are connected to electrical leads that lead through the docking element or are formed by these. These electrical leads supply the electrically driven elements of the milk frother appliance, specifically the gear pump, with electricity and control signals as the case may be.

Thereby, it is possible to provide a control of these electrically driven elements in the milk frother appliance (this appliance is then provided with the necessary electronic units and receives control signals from the coffee machine or from an input unit of the milk frother appliance) as well as to accommodate a control of these elements in the base unit itself. In the latter case, it is essentially only currents that drive the electrically driven elements in accordance with the settings of the control that are led through the electrical leads.

In particular, the control of the gear pump is configured such that the speed of the gearwheels 17 can be adjusted, i.e. is selectable. By way of this, the user can control the delivery speed and-according the procedure, which is described in more detail hereafter-as the case may be the preparation of cold frothed milk.

Figure 10:
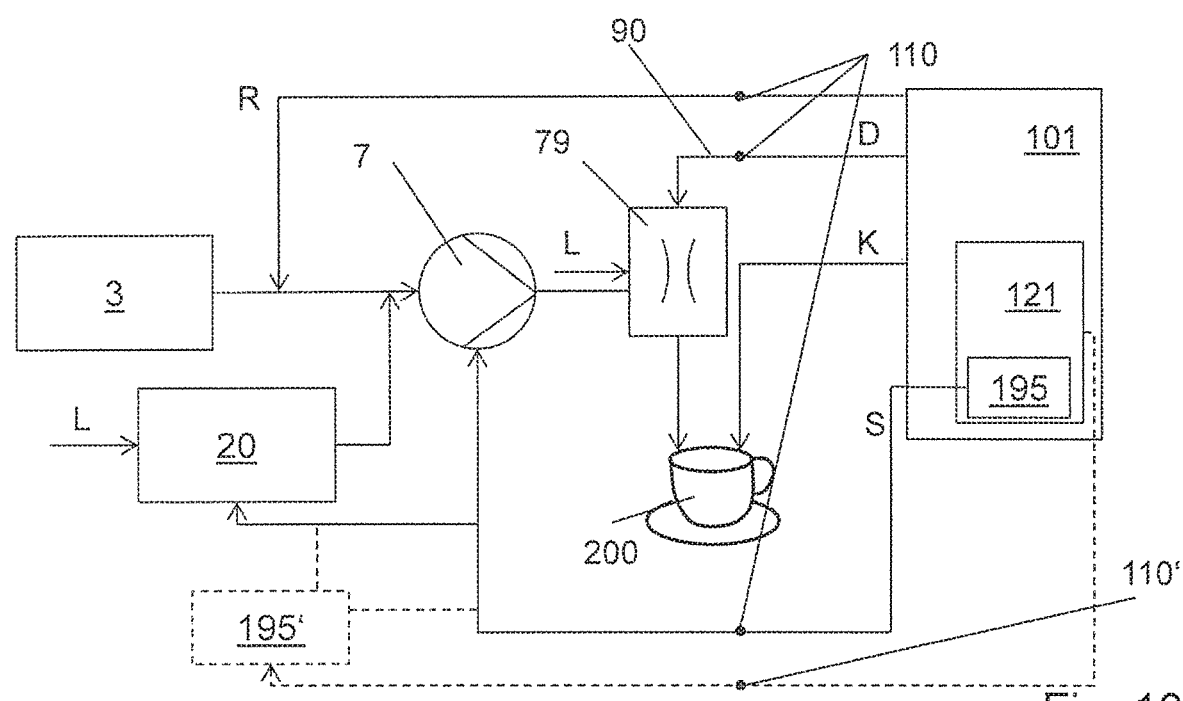
FIG. 10 a schematic view of a milk frother system according to the invention.

FIG. 10 shows an overview diagram of the milk frother appliance and its coupling onto the base unit (coffee machine 101). Air feeds are indicated at "L" in the figure. The letter D indicates a conduit for steam, K a conduit for the hot drink, R the conduit for the cleaning water or cleaning steam, which is partly formed by the hot water and/or steam feed conduit 32, and S indicates the electricity supply. Steam that is fed into the steam feed conduit D via the steam connection gets into the mixing nozzle 79, for example via a valve.

The activation 195 here is represented as part of an electronics unit 121 (control unit) of the coffee machine 101. The electronics unit 121 is configured, for example, to recognise a capsule by way of a measurement and/or to accept a user input, for example via a suitable operating element with a corresponding button, with a touchscreen and/or the like.

Here, the activation 195 is designed such that it can activate the gear pump 7 as well as the valve unit 20, wherein an operating parameter of the gear pump and/or of the valve unit can be regulated (closed-loop controlled). Activation signals for the valve unit 20 and/or for the gear pump 7 run directly via the connection location 110.

An activation 195' can also be present completely or partly as part of the milk frother appliance, alternatively to incorporating the activation completely or partly in the coffee machine. This alternative is represented in FIG. 10 in a dashed manner. The electrical energy and possibly data signals can then be transmitted from the electronics unit to the activation 195' via the alternative interface 110'.

The milk frother appliance can be operated as follows.

For the preparation of frothed milk, the gearwheels 17 are firstly wetted inasmuch as the gear pump is dry. For this purpose, a wetting quantity of water-in liquid and/or in the form of steam-controlled by the activation 195 is fed to the gear pump via the cleaning conduit R, in particular by way of delivery by the water pump of the coffee machine amid simultaneous operation of the water heating means and/or on account of the steam pressure of steam, which is produce in the water heating means.

Alternatively or supplementarily to the wetting via the cleaning conduit R, steam can also be fed into the mixing nozzle 79 via the steam feed conduit 90 and can get from there to the gear pump, where the gearwheels are likewise wetted by way of the condensation of the steam, and the delivery of steam is also effected by way of the water pump and/or the steam pressure. As is shown in FIG. 10, the steam feed conduit can herein run out into the mixing nozzle 79 downstream of the gearwheels 7 or however alternatively also run out into the milk conduit upstream of the gearwheels or be admixed via a mixing nozzle, which lies upstream of the gearwheels.

The gear pump is brought into motion subsequent to the wetting, whilst for example air is sucked via the valve unit 20 (alternatively via a valve unit in the base unit 101 and via a suitable conduit crossing the docking element). A vacuum is produced at the inlet side of the gear pump due to the effect of this pump, and this vacuum sucks milk-through the milk suction tube 18 and the respective duckbill valve 42-as well as air. The air valve can firstly remain closed for 1-3 s and therefore milk firstly be sucked into the pump, in order to increase the reliability of the sucking of the milk. Milk froth therefore arises in the gear pump as soon as the air valve is opened and this froth gets through the feed-through 36-whose narrowness encourages the formation of fine-pored froth-, the outgoing conduit and the docking element 25 to the milk froth outlet 28 and is dispensed there, wherein generally a drinks vessel 200 is placed upon the platform 103.

Inasmuch as the milk is only to be delivered but not frothed, the operation of the gear pump is effected without the sucking of air (closed valve unit).

The sucking of the-generally cold-milk out of the milk container 3 via the gear pump is also effected for the preparation of warm frothed milk or unfrothed milk. This gear pump delivers the milk into the mixing nozzle. Steam from the coffee machine is simultaneously fed to this nozzle via the steam connection. Optionally, air can also be fed to this mixing nozzle supplementarily or alternatively to the feed of air to the gear pump. The milk is mixed with the steam in the mixing nozzle 79, wherein the steam heats the milk. The warm, frothed or unfrothed milk is also delivered through the milk froth outlet.

If the gear pump is already moist-which would be the case, for example, if a wetting and/or a use has already taken place since the last starting or since the last waking from a sleep mode, without the milk frother appliance having been removed in the meanwhile-the step of the wetting can be skipped. Other criteria can also be used, in order to determine whether the gear pump is dry or whether the gearwheels are already moistened—for example the time since the last use/wetting of the gear pump, said time being measured by a timer, by a humidity measurement, by a measurement entailed by a short test run (for example with a shaking sensor that determines a pattern which, when the pump leaks, is different to when its runs in a correct manner), etc.

In the represented embodiment example, the drinks preparation machine 100 with the base unit and the milk frother appliance forms the milk frother system according to the invention. Alternatively, it would also be possible to provide a milk frother appliance, which itself includes a control, an electricity connection and a water heater or steam generator, without a connection to the base unit and according to the invention is configured to wet the gearwheels of the gear pump before an operation, in particular when they are dry.

LIST OF REFERENCE NUMERALS

1 milk frother appliance
3 milk container
5 milk frothing unit
6 cover
7 gear pump
11 lower base housing part
12 window
13 electric motor
14 upper base housing part
15 arching (in the milk frothing unit cover)
16 milk frothing unit cover
17 gearwheels
18 milk suction tube
19 shaft
20 valve unit
21 seal
22 connection shaped part
23 spacer
24 motor seal element
25 main body (of the docking element)
26 docking element housing
27 supplementary part
28 milk froth outlet
31 liquid conduit
32 hot water and/or steam feed conduit
34 air feed conduit
35 outgoing conduit
36 feed-through
41 duckbill valve
42 duckbill valve
43 duckbill valve
51 channel for hot water and/or steam feed conduit
52 channel for air feed conduit
53 channel for outgoing conduit
79 mixing nozzle
90 steam feed conduit into the mixing nozzle
100 drinks preparation machine
101 coffee machine
103 placement platform
105 coffee outlet
106 front
107 milk frother platform
108 outlet hood
110 connection location
110' alternative interface
121 electronics unit
195 activation
195' alternative activation
200 drinks vessel

The invention claimed is:
1. A milk frother system,
comprising a gear pump which at the inlet side is connected at least to a milk feed conduit which is connectable to a milk vessel that is filled with milk, by which means milk can be sucked out of the milk vessel by the gear pump, and further comprising a feed conduit for water and/or steam to the gear pump,
wherein the milk frother system is configured to deliver, only under predefined conditions, before delivery of milk by the gear pump, and as a reaction to a user's activating a delivery of milk, water and/or steam to the gear pump via the feed conduit, in order to wet the gear pump, and wherein the predefined conditions comprise at least one of:

the system has been switched on after a last operation of the gear pump;

the system has been woken from a standby mode or sleep mode;

a milk frother appliance, which comprises the gear pump, has been removed from a base unit and placed on the base unit again;

more than a predefined time has elapsed since a last operation of the gear pump.

2. The milk frother system according to claim 1, wherein the milk vessel is arranged further to the bottom than the gear pump.

3. The milk frother system according to claim 1, comprising a control unit which is programmed, before the delivery of milk by the gear pump, to deliver the water and/or steam to the gear pump only under the predefined conditions.

4. The milk frother system according to claim 1, wherein gearwheels of the gear pump are coated with a fluorine-containing polymer or consist of a fluorine-containing polymer.

5. The milk frother system according to claim 1, further comprising a device for feeding air to an inlet side of the gear pump.

6. The milk frother system according to claim 1, further comprising the milk frother appliance, which comprises the gear pump, and the base unit having a water pump and a water heater, wherein the water and/or the steam can be delivered by the base unit for the wetting of the gear pump and can be delivered into the feed conduit via an interface.

7. The milk frother system according to claim 6, wherein the base unit is designed as a coffee machine for preparing coffee from coffee powder, which is present in a portion packaging, and from hot water.

8. The milk frother system according to claim 1, comprising a mixing nozzle that connects onto the gear pump at the outlet side and to which milk, which is delivered by the gear pump, steam and optionally air can be fed.

9. A method for operating a milk frother system, with a gear pump, which is connected at the inlet side at least to a milk feed conduit, which is connectable to a milk vessel, which is filled with milk, and further comprising a feed conduit for water and or steam to the gear pump, according to which method, after activation by a user for a delivery of milk to the gear pump, the gear pump sucks milk out of the milk vessel and delivers the milk further from there, wherein only under predefined conditions, after the activation and before the delivery of milk, water and/or steam is led to the gear pump via the feed conduit, in order to wet the gear pump, and wherein the predefined conditions comprise at least one of:

the system has been switched on after the last operation of the gear pump;

the system has been woken from a standby mode or sleep mode;

a milk frother appliance, which comprises the gear pump, has been removed from a base unit and placed on the base unit again;

more than a predefined time has elapsed since the last operation of the gear pump.

10. The method according to claim 9, wherein a liquid volume of the water and/or steam which is delivered under the predefined conditions is between 1 ml and 10 ml.

* * * * *